J. WEBSTER.
Sad-Iron Handle.
No. 162,981.
Patented May 4, 1875.
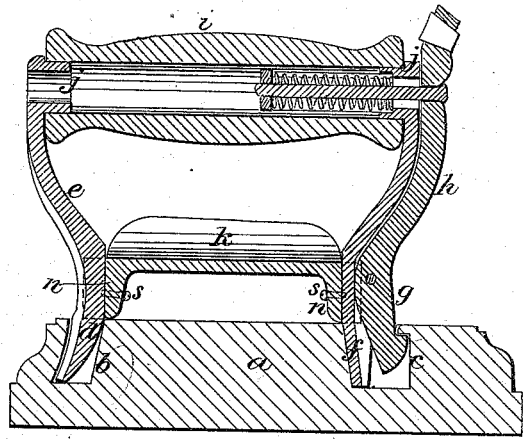
WITNESSES
John C Laing.
J. H. Rutherford
INVENTOR
Joel Webster
by Johnson and Johnson
his Attys.
THE GRAPHIC CO.PHOTO-LITH.39 & 41 PARK PLACE, N.Y.

UNITED STATES PATENT OFFICE.

JOEL WEBSTER, OF BROOKLYN, NEW YORK, ASSIGNOR TO JOHN C. KELLEY, OF NEW YORK CITY.

IMPROVEMENT IN SAD-IRON HANDLES.

Specification forming part of Letters Patent No. 162,981, dated May 4, 1875; application filed October 15, 1874.

*To all whom it may concern:*

Be it known that I, JOEL WEBSTER, of Brooklyn, in the county of Kings and State of New York, have invented certain new and useful Improvements in Sad-Iron Handles; and I do hereby declare that the following is a full, clear, and exact description thereof, which will enable others skilled in the art to which it pertains to make and use the same, reference being had to the accompanying drawings and to the letters of reference marked thereon, which form a part of this specification.

My invention relates to smoothing-irons adapted for use with handles made removable from sockets in the iron; and the object of my improvement is to utilize the shield as a clamp to unite and hold the arms, the handle, and the spring thumb-catch together as a single frame, without the necessity of securing the handle to the arms by screw-bolts. This I effect by the peculiar manner of uniting the arms to the shield, which consists of holding-arms of wedge form, tapering upward at the edges thereof, as shown in Fig. 4, and beveled outward on said edges, as shown in Fig. 2, in combination with a shield having socket ends corresponding in form to the wedge and beveled edges of the arms, whereby, when the ends of the shield are fitted over and pressed down into place upon the arms, they will dovetail and draw hard together, while the shield is driven down upon its wedge-seats, and thus, in clamping the lower ends of the arms firmly together, also clamps the handle securely between the upper ends of the arms, and binds the whole as a single handle, rendering it less expensive and more easily put together, and adapting the handle, when so put together, for uniform use with the socketed irons, which uniform application has been found very difficult when the handles are secured to the arms by screw-fastenings, as in my patent of December 9, 1862.

In the accompanying drawings, Figure 1 represents a vertical section of a sad-iron embracing my invention; Fig. 2, a horizontal section of the handle above the shield; Fig. 3, a front view of the handle-arm and shield; and Fig. 4, an enlarged detailed view of the shield-locking socket and wedge-seat.

The top of the smoothing-iron $a$ is provided with a rear outwardly-inclined socket, $b$, and a front lipped or shouldered socket, $c$, the former to receive the curved end $d$ of the handle-arm $e$, and the latter the straight end $f$ and spring-catch $g$ of the front arm $h$. These arms are of the usual construction, (except in the particulars hereinafter described,) and the handle $i$ is secured to and between their upper ends. The front arm is grooved on its outer side to receive the curved spring-catch $g$, which is pivoted near its lower end, and the thumb-extension rises above the handle, and has a spring-connection therewith to force the catch beneath the holding-shoulder. The handle has no other fastening than being clamped between the arms upon their tubular inward projections $j$. The shield $k$ holds the handle parts intact. This is effected by side seats $l\ l$, formed by outward bevels upon the lower ends of the arms, and a wedge form tapering upward from the base $m$ to the point $m'$, and over and upon these double-inclined seats, socket projections $n$, of corresponding form, on the ends of the shield $k$, are fitted and firmly set, so as to lock the arms together, and clamp and secure the handle between their upper ends. The outward-beveled seats $l\ l$ and the corresponding shield-sockets bind the arms endwise, and, by the wedge shape of these socket projections, they are driven home vertically.

To prevent its possible separation from accidental falling or becoming loose from constant use, I combine, with the interlocking sockets $n$, clamp-screws $s\ s$, passing through from the inner sides, and binding against the inner faces of the wedge-seats.

By this construction the shield unites and secures the handle parts, rendering it firm and durable, and maintaining the perfect adjustment of the arms and the spring-catch, so that they shall always fit the sockets of the smoothing-iron.

I claim—

A handle for sad-irons, having the holding-arms of wedge form $m\ m'$, with beveled edges $l\ l$, in combination with the shield $k$, having socket ends $n$, corresponding in form to the arms, whereby the shield is dovetailed with the arms, and holds and clamps them intact with the handle.

In testimony that I claim the foregoing as my own, I have affixed my signature in presence of two witnesses.

JOEL WEBSTER.

Witnesses:
 H. F. READ,
 E. BARRACLOUGH.